F. BENTIVEGNA.
KETTLE.
APPLICATION FILED JAN. 14, 1918.

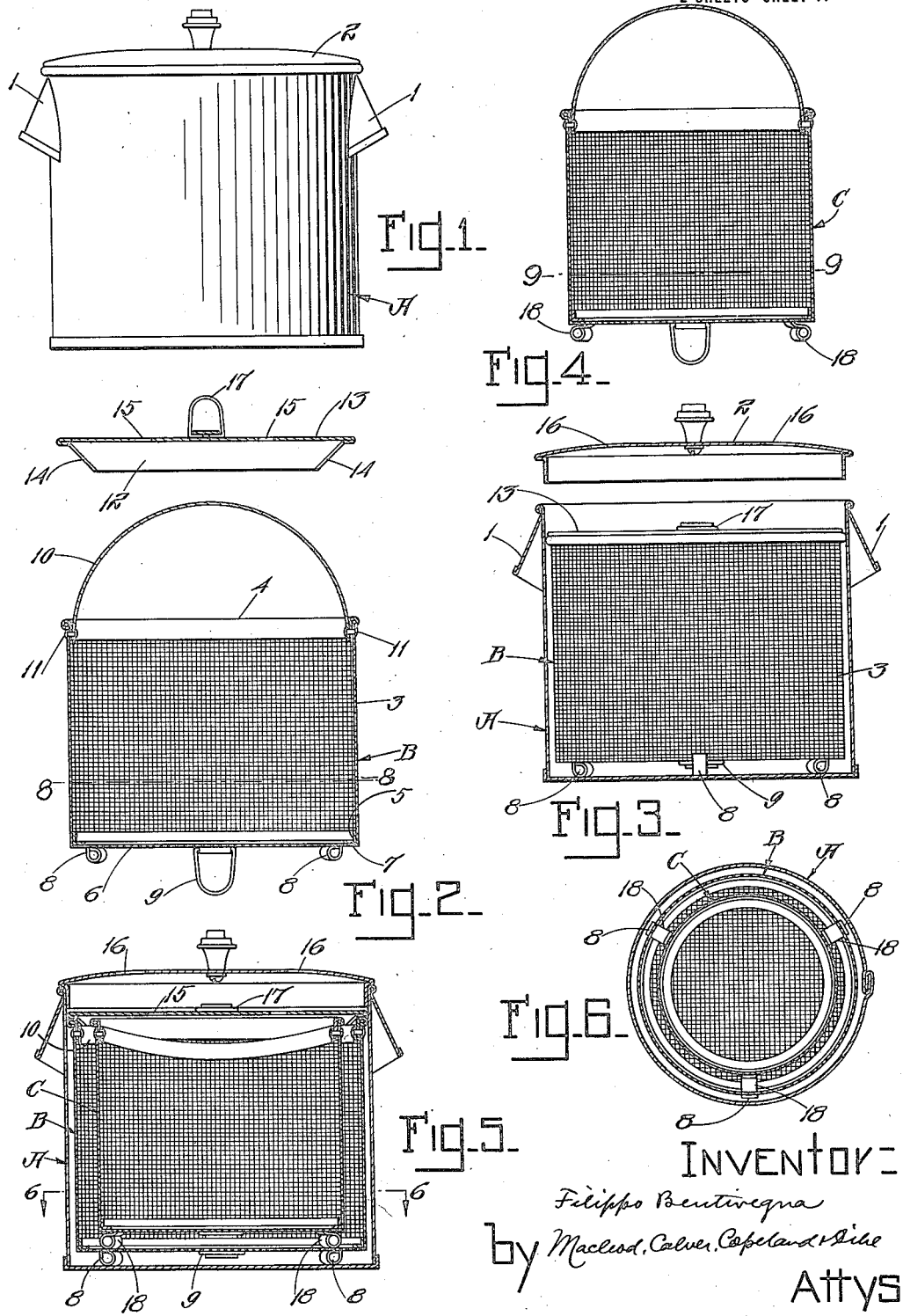

1,295,414.

Patented Feb. 25, 1919.
2 SHEETS—SHEET 2.

INVENTOR:
Filippo Bentivegna
by Macleod, Calver, Copeland & Dike
Attys.

UNITED STATES PATENT OFFICE.

FILIPPO BENTIVEGNA, OF BOSTON, MASSACHUSETTS.

KETTLE.

1,295,414.  Specification of Letters Patent.  Patented Feb. 25, 1919.

Application filed January 14, 1918. Serial No. 211,723.

*To all whom it may concern:*

Be it known that I, FILIPPO BENTIVEGNA, a subject of the King of Italy, residing at Boston, county of Suffolk, State of Massachusetts, have invented a certain new and useful Improvement in Kettles, of which the following is a specification, reference being had therein to the accompanying drawings.

The invention relates to new and useful improvements in cooking kettles. One object of the invention is to provide a double kettle for cooking meats, vegetables and other foods by either boiling or steaming in which the outer receptacle is of sheet metal or other suitable material which has a tight peripheral surface and bottom and is provided with a cover and in which the inner receptacle is of fine wire mesh both as to its periphery and bottom and is provided with a cover. Another object of the invention is to provide the inner receptacle with feet by which the said inner receptacle is raised above the bottom of the outer receptacle so that the water contained within the outer receptacle may not only pass through the side of the inner receptacle, but also may enter from the bottom; the elevation of the bottom of the inner receptacle also prevents the burning of the contents of the inner receptacle if the water within the outer receptacle all evaporates. Another feature of the invention consists in providing a hinged bail for the top of the inner receptacle by which it can be lifted out of the outer receptacle which bail is foldable down inside of the rim of the inner receptacle so as not to interfere with the cover or with the food in the receptacle when the cover is on, and also in providing the inner receptacle with a hinged handle on its under side which is useful in connection with the bail at the top for handling the inner receptacle to pour out the cooked food therefrom. Another feature of the invention relates to the construction of the flange of the cover for the inner receptacle to form a clearance for the hinges of the bail in the receptacle. Other features of the invention will be pointed out in the specification and claims.

The invention will be fully understood from the following description taken in connection with the accompanying drawings and the novel features thereof will be pointed out and clearly defined in the claims at the close of this specification.

In the drawings, Figure 1 is a side elevation of the outer receptacle of a device embodying the invention, the cover being closed.

Fig. 2 is a vertical section of an inner receptacle separated from the outer receptacle and showing the top bail and the bottom handle extended for the purpose of more clearly illustrating the invention and showing the cover for the inner receptacle lifted therefrom.

Fig. 3 is a vertical section showing in elevation the receptacle of Fig. 2 inclosed within the receptacle shown in Fig. 1, the cover of the receptacle of Fig. 2 being shut down and the bail turned down into horizontal position, and the cover of the outer receptacle being shown as separated from the receptacle.

Fig. 4 is a vertical section showing an additional wire mesh receptacle of smaller diameter than that shown in Fig. 2 but otherwise of very similar construction and adapted to nest inside of the receptacle of Fig. 2.

Fig. 5 is a vertical section showing both of said inner receptacles and the outer receptacle all nested together and the covers closed.

Fig. 6 is a section taken on line 6—6 of Fig. 5.

Only one of the two inner receptacles would practically ever be used at the same time, the different sizes being for the purpose of conveniently nesting them together when not in use.

Figure 8:
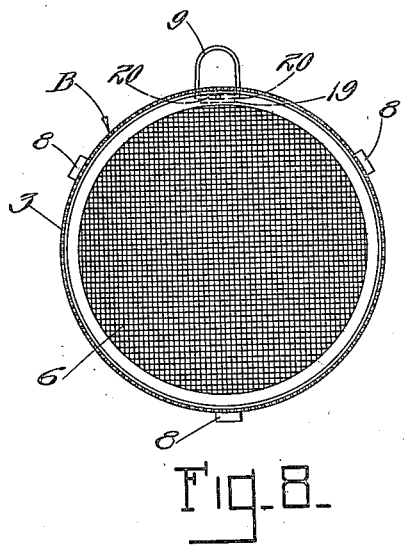
Fig. 8 is a section on line 8—8 of Fig. 2 but showing the bottom bail turned into a horizontal outward position.
Figure 9:
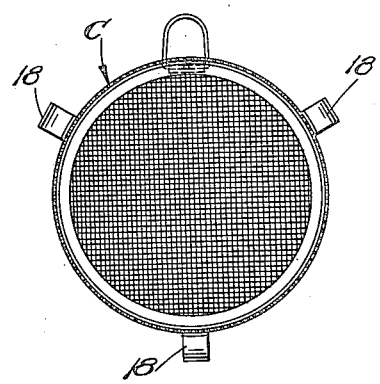
Fig. 9 is a section on line 9—9 of Fig. 4 but showing the bottom bail extending in a horizontal outward position.

Referring now to the drawings, the outer receptacle A is of any suitable metal with tight peripheral surface and bottom, the same preferably being of sheet metal and provided with handles 1 and a cover 2. The inner receptacle B which is the larger of the two inner receptacles is composed of fine wire gauze and is of cylindrical shape the upper rim of the gauze cylinder 3 being secured to a metallic hoop 4 to hold it in shape. It is secured at its lower end to the vertical portion of a hoop 5 L-shaped in cross section and the bottom 6 which is also of fine wire gauze is secured to the horizontal flange 7 of said hoop 5. The said flange 7 serves both to reinforce the gauze and retain in shape the periphery and the bottom 6 of the receptacle B and it also serves as a union between the periphery and bottom. Metallic feet 8 are provided, preferably 3 or more in number to afford steadiness of support and are secured to the hoop 5. These feet are preferably of sheet metal bent over to form a scroll base and are of sufficient height to raise the bottom of the receptacle B a short distance above the bottom of the outer receptacle A so that there will be free circulation of water below the bottom of the receptacle B, and so that if the water should entirely evaporate the bottom of the receptacle B will be out of contact with the bottom of the receptacle A so that the food contained within the receptacle B will be in less danger of being scorched. The gauze receptacle B is of less diameter than the receptacle A so that there is a water space entirely around the periphery of the gauze receptacle B. The feet 8 of the receptacle B spread away from its outer periphery as shown in Figs. 6 and 8 so as to always insure a space entirely around the periphery of the receptacle B within the receptacle A.

A wire handle 9 is hinged to the under side of the horizontal flange 7 of the bottom hoop 5 near the outer edge of the bottom. The hinging is effected by bending the ends 20 of the wire handle 9 to form a hinge pin which turns loosely in a tubular hinge member 19 secured to the bottom 6 near the periphery. This handle 9, in conjunction with the bail 10 may be used in tipping the receptacle B to pour out the contents after the receptacle B is lifted out of the receptacle A.

The handle 10 in the form of a bail is pivotally connected at its ends by the pivots 11, 11 to the inner side of the upper hoop 4. This bail is nearly semi-circular being slightly flattened or of semi-elliptical form and is of a radius slightly less than the inside radius of the hoop 4 so that when the bail is turned down into a horizontal position it will fold inside of the inner periphery of the hoop 4 leaving a slight space between the hoop 4 and the bail to receive the flange 12 of the cover 13. The said inner receptacle 3 is provided with a cover 13 having a downwardly extending flange 12 which, when the cover is put on, extends down between the hoop 4 and the bail 10. The pivots 11 on which the bail 10 is pivoted bind sufficiently in the bail so that the bail will be held by friction in the horizontal position when it is turned down into that position and will not of itself drop down lower.

Figure 7:
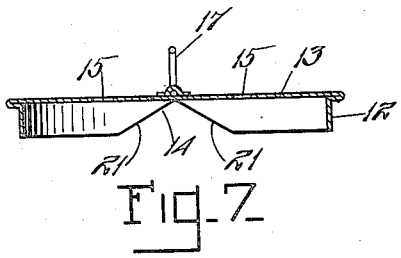
Fig. 7 is a section through the cover shown in the upper part of Fig. 2 taken at right angles to the section shown in Fig. 2.

The flange 12 of the cover 13 is formed on two opposite sides with flaring notches 14 having flaring sides 21 as shown in Figs. 2 and 7 to enable the notches 14 to straddle the pivot pins so to allow the close shutting down of the cover.

The cover 13 is formed with a plurality of perforations 15 and the cover 2 of the outer receptacle is formed with a plurality of perforations 16 to afford escape of steam. Preferably the perforations in the outer cover are larger than those in the inner cover but fewer in number so as to afford about the same port area. Preferably also the orifices 16 do not register with the orifices 15. Thus the passage of the steam from the inner receptacle to the outer receptacle is indirect and the steam is thus retarded in its escape effecting a saving of heat.

The cover 13 for the inner receptacle is provided with a hinged handle 17 which may be turned down onto the top of the cover so as not to interfere with the outer cover 2 of the outer receptacle.

The smaller inside receptacle C is made substantially like the larger gauze receptacle B except as to size. One difference however, is in the form of the feet 18 which are made to spread outwardly more than the feet 8 of the receptacle B as well as to extend downwardly.

The inner receptacles B and C are both of them made of such fine wire gauze that whichever one of them is used, it will retain all of the solid matter which is being cooked. After the contents are cooked and the cover removed, said inner receptacle may be lifted out by its handle and when it is lifted the liquid will drain out into the outer receptacle. The contents of the inner receptacle may be left therein until such time as it is desired to remove them and by the aid of the bail 10 and the bottom handle 9 the contents may if desired be easily emptied out into some other receptacle. The bottom handle 9 being hinged to the bottom band near its outer edge is much more convenient for handling than if it were attached farther in from the periphery. By reason of its being attached near the edge, when it is grasped by the fingers, its hinge connection will allow the portion which is grasped by the fingers, that is, the outer end of the loop, to extend out away from the bottom and side of the inner receptacle so that the handle will not come in contact with the receptacle itself or be underneath it.

The size of the mesh of the wire gauze is shown somewhat exaggerated in the drawings because it is difficult to illustrate it as fine as it should be clearly.

It is obvious that the outer receptacle A, the intermediate receptacle B and the innermost receptacle C may all be nested together as clearly shown in Fig. 5 and when the covers are put on the outer receptacle and the intermediate receptacle as shown in said Fig. 5 the external appearance will be as shown in Fig. 1, the two gauze receptacles being entirely out of view. The innermost receptacle C is entirely inclosed within the intermediate receptacle B, said intermediate receptacle B having the cover 17. The innermost receptacle cannot rattle around in the intermediate receptacle because the feet 18 of the innermost receptacle spread outwardly to the inner periphery of the intermediate receptacle. Thus the three receptacles are all nested together and have the external appearance of but a single receptacle.

What I claim is:

1. In combination with an outer receptacle, a reticulate receptacle within said outer receptacle having a bail pivotally connected at its two ends with the inner periphery of the said inner receptacle near its upper rim, said bail being of a radius to permit it to be turned down inside of the inner periphery of the rim for the said inner receptacle, and a cover provided with a flange which extends down on the inside of the said inner receptacle and is formed with two cut out notches which respectively straddle the pivot connections at the two ends of the bail when the bail is turned down into the said inner receptacle.

2. In combination with an outer receptacle, a reticulate receptacle within said outer receptacle having a bail pivotally connected at its two ends with the inner periphery of the said inner receptacle near its upper rim, said bail being of a radius to permit it to be turned down inside of the inner periphery of the rim of the said inner receptacle leaving a thin space between the bail and the inner periphery of the said inner receptacle, and a cover provided with a flange which extends down on the inside of the said inner receptacle into the space between the rim and the turned down bail and is formed with two cut out notches which respectively straddle the pivot connections at the two ends of the bail.

3. In combination with an outer sheet metal receptacle having a removable cover, a reticulate receptacle within said outer receptacle, said inner receptacle being of sufficiently less diameter than the outer receptacle to leave the water space between the peripheries of said two receptacles, said inner receptacle having a bottom provided with feet which extend outwardly beyond the plane of the periphery of said inner receptacle, said inner receptacle having a bail pivotally connected at its two ends with the inner periphery of said inner receptacle and being of a radius to permit it to be turned down inside of the inner periphery of said inner receptacle, and a cover for said inner receptacle provided with a flange which extends down on the inside of said inner receptacle and is formed with two cut out notches which respectively straddle the pivot connections at the two ends of the bail when the bail is turned down.

In testimony whereof I affix my signature.

FILIPPO BENTIVEGNA.